(12) United States Patent
Hofmann et al.

(10) Patent No.: US 10,549,734 B2
(45) Date of Patent: Feb. 4, 2020

(54) SENSOR ARRANGEMENT FOR DETECTING A STATE OF A ROADWAY USING AN ULTRASONIC SENSOR, A DRIVER ASSISTANCE SYSTEM, A MOTOR VEHICLE, AND AN ASSOCIATED METHOD

(71) Applicants: Valeo Schalter Und Sensoren GmbH, Bietigheim-Bissingen (DE); Dr. Ing. H.C. F. Porsche Aktiengesellschaft, Stuttgart (DE)

(72) Inventors: Heiko Hofmann, Bietigheim-Bissingen (DE); Thomas Jung, Bietigheim-Bissingen (DE); Stefan Jacobi, Böblingen (DE); Bernhard Schmiedel, Stuttgart (DE); Timo Maise, Ludwigsburg (DE); Natalie Weber, Bietigheim-Bissingen (DE); Thomas Schuler, Bietigheim-Bissingen (DE)

(73) Assignees: Valeo Schalter Und Sensoren GmbH, Bietigheim-Bissingen (DE); Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 138 days.

(21) Appl. No.: 15/569,477

(22) PCT Filed: Apr. 14, 2016

(86) PCT No.: PCT/EP2016/058164
§ 371 (c)(1),
(2) Date: Oct. 26, 2017

(87) PCT Pub. No.: WO2016/173847
PCT Pub. Date: Nov. 3, 2016

(65) Prior Publication Data
US 2018/0265054 A1    Sep. 20, 2018

(30) Foreign Application Priority Data

Apr. 27, 2015  (DE) .................. 10 2015 106 408

(51) Int. Cl.
*B60W 40/06*    (2012.01)
*B60T 8/172*    (2006.01)
(Continued)

(52) U.S. Cl.
CPC ............. *B60T 8/172* (2013.01); *B60W 40/06* (2013.01); *B60W 40/068* (2013.01);
(Continued)

(58) Field of Classification Search
CPC ............ B60W 40/06; B60W 2510/22; B60W 2520/10; B60W 2520/28; B60W 2550/402
(Continued)

(56) References Cited

U.S. PATENT DOCUMENTS 5,521,594 A    5/1996   Fukushima
9,493,145 B2   11/2016  Mehr et al.
10,160,454 B2* 12/2018  Barthel ................... B60T 8/172

FOREIGN PATENT DOCUMENTS

DE    3728708 A1    3/1989
DE    4213221 A1    10/1993
(Continued)

OTHER PUBLICATIONS

JPO; App. No. 2017-556669; Japanese Office Action dated Oct. 16, 2018.
(Continued)

*Primary Examiner* — Andre J Allen
(74) *Attorney, Agent, or Firm* — Fitch, Even, Tabin & Flannery LLP

(57) ABSTRACT

The invention relates to a sensor assembly for recognizing a state of a roadway, including a sensor device, which is
(Continued)

adapted to capture an impact of water on a wheel arch lining of a motor vehicle during a travel of the motor vehicle on the roadway, and including a control device for recognizing the state of the roadway based on the impact of the water captured by means of the sensor device, wherein the sensor device includes an ultrasonic sensor, which is adapted to receive an ultrasonic signal and which is additionally adapted to capture the impact of the water on the wheel arch lining.

14 Claims, 3 Drawing Sheets

(51) Int. Cl.
 *B60W 40/068* (2012.01)
 *G01S 15/02* (2006.01)
 *G01S 15/87* (2006.01)

(52) U.S. Cl.
 CPC ............ *G01S 15/025* (2013.01); *G01S 15/87* (2013.01); *G01S 15/931* (2013.01); *B60T 2210/13* (2013.01); *B60W 2420/54* (2013.01); *G01S 2015/938* (2013.01)

(58) Field of Classification Search
 USPC .................................................. 73/146–146.8
 See application file for complete search history.

(56) References Cited

FOREIGN PATENT DOCUMENTS

| | | |
|---|---|---|
| DE | 19543137 A1 | 5/1997 |
| DE | 4235809 C2 | 7/1997 |
| DE | 19745684 A1 | 4/1999 |
| DE | 10009911 C1 | 10/2001 |
| DE | 102004016900 A1 | 10/2005 |
| DE | 102005023696 A1 | 11/2006 |
| DE | 102010008258 A1 | 8/2008 |
| DE | 102008014513 A1 | 10/2008 |
| DE | 102012221518 A1 | 5/2014 |
| JP | S62-259074 A | 11/1987 |
| JP | H08-175334 A | 7/1996 |
| JP | H09-331597 A | 12/1997 |
| WO | 2013/120706 A1 | 8/2013 |

OTHER PUBLICATIONS

International Search Report, International Patent Application No. PCT/EP2016/058164, dated Jul. 6, 2016, 3 pages.

\* cited by examiner

SENSOR ARRANGEMENT FOR DETECTING A STATE OF A ROADWAY USING AN ULTRASONIC SENSOR, A DRIVER ASSISTANCE SYSTEM, A MOTOR VEHICLE, AND AN ASSOCIATED METHOD

CROSS-REFERENCE TO RELATED APPLICATION

This application is a U.S. national phase application of International Application No. PCT/EP2016/058164, filed Apr. 14, 2016, designating the United States, which claims priority to German Patent Application No. 10 2015 106 408.1, filed Apr. 17, 2015, which is incorporated by reference herein in its entirety.

FIELD

The present invention relates to a sensor assembly for recognizing a state of a roadway including a sensor device, which is adapted to capture an impact of water on a wheel arch lining of the motor vehicle during travel of the motor vehicle on the roadway, and including a control device for recognizing the state of the roadway based on the impact of the water captured by means of the sensor device. In addition, the invention relates to a driver assistance system with such a sensor assembly. Further, the present invention relates to a motor vehicle with such a driver assistance system. Finally, the present invention relates to a method for recognizing a state of a roadway.

BACKGROUND

Presently, the interest is in particular directed to sensor assemblies, which are adapted to recognize a state of a roadway. Such a sensor assembly can for example include a sensor device, by means of which it can be recognized if the roadway is dry or if water, ice or snow is on the roadway. Based on the state of the roadway, the coefficient of friction between the roadway and the tires of the motor vehicle can be determined. This information can be used by a driver assistance system of the motor vehicle. For example, an information interface to the driver can be controlled thereby and/or the speed of the motor vehicle can be adapted depending on the recognized state of the roadway and the coefficient of friction, respectively. Such a driver assistance system can also be a traction control system or an electronic stability program, to which the information with respect to the state of the roadway is supplied.

In this context, DE 37 28 708 A1 describes a method for recognizing the coefficient of friction between a roadway and the tire of a motor vehicle. Herein, the rolling noises of at least one tire are captured by a microphone and the captured signal is analyzed in frequency. The roadway state can then be inferred from the frequency spectrum.

Moreover, DE 100 09 911 C1 describes a system for monitoring the air pressure of a motor vehicle tire by means of a sensor disposed in an air volume of an air spring. Due to the wheel oscillations, acoustic oscillations arise in the air volume, which are captured by the sensor. The sensor can be formed as a microphone or as a pressure sensor. Therein, the wheel oscillations are transmitted to the air spring via the chassis as structure-borne sound. Herein, the sensor can be formed as a microphone or as a pressure sensor.

Furthermore, from DE 10 2008 014 513 A1, a device for capturing a rolling noise of a vehicle tire is known. The device includes a sensor, which serves for capturing a rolling noise and which is disposed in a housing, which is fixed to the vehicle in oscillation-isolated manner. The sensor is preferably formed as a microphone. Alternatively, another suitable sensing element, for example a pressure sensor or an ultrasonic sensor, can also be employed as the sensor.

In order to early recognize the recognition of the occurrence of aquaplaning risk, DE 10 2010 008 258 A1 proposes a method, in which information related to course section with respect to the risk of aquaplaning is provided to the motor vehicle. In addition, at least one sensor device for determining a wet roadway is provided. Upon presence of a course section of the route with aquaplaning risk and the detection of a wet roadway, an assistance function for preventing aquaplaning is performed.

From DE 10 2012 221 518 A1, a method for ascertaining road slipperiness is additionally known. Herein, the spray projected by a wheel of the vehicle is sensorially captured. Road slipperiness is calculated from the projected spray. For capturing the projected spray, a sensor can for example be used, which is formed as a drop detector. Furthermore, a humidity sensor or a sensor for non-contact capture or counting of projected particles can be used. Water droplets, snowflakes, ice particles and/or dirt particles can be captured by the sensor.

Moreover, in the article "Sensor Systems and Signal Processing for Advanced Driver Assistance" by K. Naab and R. Hoppstock, published on the congress "Smart Vehicles", 1995, a method is described, in which the water impacting on a wheel arch lining is captured by a sensor. Further, it is described there that the noise in the wheel case varies with the vehicle speed, the engine speed and the water level on the roadway surface. Therein, the first two factors can be easily corrected such that only the portion of the water impacting on the wheel arch lining remains. The noise can be measured by a microphone. Therein, the noise can be filtered by a band-pass filter in a frequency range between 2.5 and 4.5 kHz. Further, the noise can be converted to a characteristic direct current voltage level, which correlates with the absolute water level on the roadway surface.

It is the object of the present invention to demonstrate a solution, how a sensor assembly for recognizing a state of a roadway of the initially mentioned kind can be more inexpensively and robustly provided.

SUMMARY

According to the invention, this object is solved by a sensor assembly, by a driver assistance system, by a motor vehicle as well as by a method having the features according to the respective independent claims. Advantageous implementations of the invention are the subject matter of the dependent claims, of the description and of the figures.

A sensor assembly according to the invention for recognizing a state of a roadway includes a sensor device, which is adapted to capture an impact of water on a wheel arch lining of a motor vehicle during a travel of the motor vehicle on the roadway. In addition, the sensor assembly includes a control device for recognizing the state of the roadway based on the impact of the water captured by means of the sensor device. The sensor device includes an ultrasonic sensor, which is adapted to receive an ultrasonic signal. In addition, the ultrasonic sensor is adapted to capture the impact of the water on the wheel arch lining.

The present invention is based on the realization that microphones and contact microphones, respectively, by which the impact of water on the wheel arch lining is determined, are not designed for the permanent employment in the wheel case. In addition, such microphones are too expensive for series employment in the motor vehicle. Instead of microphones, now, a sensor device is used, which comprises an ultrasonic sensor. Such ultrasonic sensors are for example used in connection with parking assistance systems in motor vehicles. The ultrasonic sensor can be formed to emit an ultrasonic signal. For this purpose, a membrane of the ultrasonic sensor is mechanically oscillated by a corresponding transducer element. The ultrasonic signal can for example have a frequency of about 50 kHz. Further, the ultrasonic signal reflected from an object in an environmental region of the motor vehicle can again be received by the ultrasonic sensor. Hereto, the oscillation of the membrane generated by the reflected ultrasonic signal is captured by the transducer element. Such an ultrasonic sensor is characterized by its low investment cost as well as by its robustness with respect to environmental influences.

The ultrasonic sensor can be disposed in an area of a wheel case or a wheel house of the motor vehicle. The wheel case describes the area of the motor vehicle, in which the wheels of the motor vehicle are disposed at least in certain areas. A wheel arch lining is disposed in the wheel case. This wheel arch lining faces a tread of the wheel and the tire, respectively, at least in certain areas. The wheel arch lining, which can also be referred to as wheel case inner lining, can be manufactured from a plastic. The wheel arch lining is in particular disposed within the wheel case or the wheel house. Water, which impacts on the wheel arch lining, can now be captured by the sensor device or by the ultrasonic sensor. Therein, particles, for example dirt particles, can also be dissolved in the water. The water can also be partially frozen. If the motor vehicle is moved on the roadway, water, which is on the surface of the roadway, can be projected to the wheel arch lining by the rotation of the wheel of the motor vehicle. The water, which is on the roadway surface, then impacts on the wheel arch lining as water drops or as splash water and spray, respectively. In particular, an ultrasonic signal can be received by the ultrasonic sensor, which arises by the impact of the water on the wheel arch lining. Thus, it can be examined by the sensor assembly if water is on the surface of the roadway. In this manner, the state of the roadway and of the roadway surface, respectively, can be recognized. Based on the recognized state of the roadway, the coefficient of friction between the tires and the wheels, respectively, of the motor vehicle and the roadway surface can then be inferred.

Preferably, the ultrasonic sensor is disposed such that the water impacting on the wheel arch lining causes a mechanical oscillation of a membrane of the ultrasonic sensor. In particular, the ultrasonic sensor can be disposed at or in the wheel arch lining such that mechanical oscillations can be transmitted from the wheel arch lining to the membrane of the ultrasonic sensor by structure-borne sound. If water is projected from the roadway surface to the wheel arch lining in the travel of the motor vehicle, the wheel arch lining can be mechanically oscillated. This mechanical oscillation can then be captured by the ultrasonic sensor. In addition, an acoustic signal can be generated by the water impacting on the wheel arch lining, which mechanically oscillates the membrane. Thus, it can be examined if water is on the roadway surface with the aid of a commercial ultrasonic sensor.

In a further configuration, the membrane of the ultrasonic sensor is at least partially formed of metal. The membrane of the ultrasonic sensor can in particular be completely formed of a metal. For example, the membrane of the ultrasonic sensor can be formed of aluminum. The membrane of the ultrasonic sensor can in particular be pot-shaped formed. The membrane of the ultrasonic sensor can be mechanically coupled to a transducer element, for example a piezoelectric element. A mechanical oscillation of the membrane can be captured by the transducer element. An ultrasonic sensor comprising a membrane of a metal is characterized by its high robustness with respect to environmental influences, for example stone chip, ice and/or snow slush, compared to a microphone.

In an embodiment, the ultrasonic sensor is disposed on a side of the wheel arch lining facing away from a wheel of the motor vehicle. In other words, the ultrasonic sensor can be disposed hidden behind the wheel arch lining. Thus, the ultrasonic sensor can be disposed on a rear side of the wheel arch lining. The ultrasonic sensor and in particular the membrane of the ultrasonic sensor can be mechanically coupled to the wheel arch lining. The ultrasonic sensor can be fixed to the side of the wheel arch lining facing away from the wheel by a corresponding retaining element. For example, the retaining element can be adhered to the wheel arch lining. Moreover, a damping element can be disposed on the ultrasonic sensor and/or the wheel arch lining, which prevents mechanical oscillations arising in the operation of the motor vehicle from being transmitted to the ultrasonic sensor. If the ultrasonic sensor is disposed hidden behind the wheel arch lining, it can be particularly protected from environmental influences and thus be reliably operated.

In a further configuration, the wheel arch lining comprises a passage opening and the ultrasonic sensor is disposed within the passage opening at least in certain areas. The wheel arch lining can comprise a passage opening or a bore. The ultrasonic sensor or the membrane of the ultrasonic sensor can be disposed in this bore at least in certain areas. Thus, an acoustic signal within the wheel case can in particular be captured by the ultrasonic sensor, which arises in that the water impacts on the wheel arch lining. Thus, it can be reliably captured if water is on the roadway surface with the aid of the ultrasonic sensor.

In a further configuration, the control device is adapted to operate the ultrasonic sensor in a receiving mode for capturing the water impacting on the wheel arch lining, in which a transducer element determines an oscillation of a membrane of the ultrasonic sensor. Commercial ultrasonic sensors can for example be operated in a transmitting mode, in which they emit the ultrasonic signal, and in a receiving mode, in which they receive a reflected ultrasonic signal or an echo signal. Presently, the ultrasonic sensor is operated in the receiving mode by means of the control device. In the receiving mode, the membrane of the ultrasonic sensor is not mechanically oscillated by the transducer element. In the receiving mode, a mechanical oscillation of the membrane can be captured with the aid of the transducer element. In this manner, a commercial ultrasonic sensor can be used to recognize a state of the roadway.

Furthermore, it is advantageous if the transducer element is adapted to provide a sensor signal, which describes the oscillation of the membrane, and the control device is adapted to examine the sensor signal in a frequency range between 2 and 5 kHz and/or in a frequency range of a resonant frequency of the membrane for determining the state of the roadway. In particular, the control device can be adapted to examine the sensor signal in a frequency range between 2.5 and 4.5 kHz for determining the state of the roadway. The transducer element can for example be a piezoelectric element, which provides a voltage signal variable in time as the sensor signal as a result of the oscillation of the membrane. This sensor signal can be filtered in the ultrasonic sensor itself or with the aid of the control device. The sensor signal can be filtered such that the frequency range between 2 kHz and 5 kHz is amplified. For this purpose, a corresponding band-pass filter can for example be used. Alternatively or additionally, the sensor signal can be examined in the range of the resonant frequency of the ultrasonic sensor or the membrane of the ultrasonic sensor. The resonant frequency of the membrane can for example be 51.2 kHz. Thus, the excitation of the membrane in its resonant frequency, which is caused by the impact of the water, can be recognized. A commercial ultrasonic sensor, which is for example operated at a frequency of ca. 50 kHz, in particular 51.2 kHz, can be used to capture the impact of water on the wheel arch lining.

Preferably, the control device is adapted to determine an amount of the water impacting on the wheel arch lining and to adapt a sensitivity of the ultrasonic sensor depending on the determined amount. The control device can in particular examine the sensor signal provided by the transducer element with regard to the frequency and/or the amplitude. For example, if it is recognized with the aid of the ultrasonic sensor that water droplets only impact on the wheel arch lining in isolated manner, it can be assumed that the amount of the water located on the roadway surface is relatively low. If the water impacts on the wheel arch lining in the form of splash water, it can be assumed that a water film is on the roadway surface. The ultrasonic sensor can now be operated with a variable sensitivity threshold with the aid of the control device. For adapting the sensitivity of the ultrasonic sensor, an amplification of the sensor signal can be adapted. Further, only those parts of the sensor signal can be taken into account, which exceed a predetermined threshold value. This threshold value can now be adapted to the case of application. For example, if individual water drops are to be recognized, which impact on the wheel arch lining, a relatively low threshold value can be preset. If splash water is to be recognized, the threshold value can be correspondingly increased.

Preferably, the control device is adapted to decrease the sensitivity of the ultrasonic sensor with increasing amount of the water. If the threshold value for the sensor signal is for example set low, this can result in the fact that an amplifier, by which the sensor signal is amplified, goes into saturation upon occurrence of splash water in the wheel case. This can result in the fact that the impact of water on the wheel arch case cannot be reliably captured. For example, a change between a state, in which water impacts on the wheel arch lining, and a state, in which water does not impact on the wheel arch lining, cannot be recognized or only be recognized in delayed manner. In order to avoid this, the threshold value and thereby the sensitivity is adapted depending on the sensor signal. For example, the threshold value can be adapted depending on the amplitude of the sensor signal. Despite of the adaptation of the sensitivity, the frequency and the strength of the water impacting on the wheel arch lining can further be inferred due to the knowledge of the threshold value.

A driver assistance system according to the invention for a motor vehicle includes a sensor assembly according to the invention. Therein, the sensor assembly can also include multiple sensor devices, which are connected to the control device for data transfer. For example, a sensor device can be associated with each wheel and each wheel case, respectively, of the motor vehicle. It can also be provided that multiple sensors are disposed at or in a wheel case.

Preferably, the driver assistance system comprises at least one further ultrasonic sensor, which is adapted to capture an object in an environmental region of the motor vehicle. The further ultrasonic sensor can for example be disposed in or behind a bumper of the motor vehicle. Multiple further ultrasonic sensors can also be provided, which are disposed distributed at the bumpers of the motor vehicle. These ultrasonic sensors serve for capturing an object in the environmental region of the motor vehicle. In particular, a distance between the motor vehicle and the object can be determined with the aid of the ultrasonic sensors. These further ultrasonic sensors can be a part of a parking assistance system, a blind spot assist and/or an adaptive cruise-control.

Preferably, the control device of the sensor assembly is connected to the at least one further ultrasonic sensor for data transfer. This means that a single control device can be used for the sensor assembly and for a parking assistance system, an adaptive cruise control and/or a blind spot assist. This control device can for example be constituted by an electronic control unit (ECU) of the motor vehicle. Thus, the sensor assembly can be provided in particularly inexpensive and installation space saving manner.

In a further configuration, the driver assistance system is adapted to control an information interface to a driver of the motor vehicle and/or to adapt a speed of the motor vehicle depending on the state of the roadway captured by the sensor assembly. For example, if it is recognized by the sensor assembly that the amount of water located on the roadway surface exceeds a predetermined limit value, information and/or warning can for example be output to the driver by means of the information interface. Alternatively or additionally, the speed of the motor vehicle can be reduced with the aid of the driver assistance system. Hereto, the driver assistance system can perform an intervention in the brake system of the motor vehicle. By reducing the speed of the motor vehicle, the risk of aquaplaning can be reduced.

A motor vehicle according to the invention includes a driver assistance system according to the invention. The motor vehicle is in particular formed as a passenger car.

A method according to the invention serves for recognizing a state of a roadway. Herein, an impact of water on a wheel arch lining of the motor vehicle is captured by means of a sensor device during a travel of the motor vehicle on the roadway. In addition, the state of the roadway is recognized based on the impact of the water captured by means of the sensor device by means of a control device. The sensor device includes an ultrasonic sensor, which is adapted to emit an ultrasonic signal and to receive the ultrasonic signal reflected from an object. Therein, the impact of the water on the wheel arch lining is captured by the ultrasonic sensor.

The preferred embodiments presented with respect to the sensor assembly according to the invention and the advantages thereof correspondingly apply to the driver assistance system according to the invention, to the motor vehicle according to the invention as well as to the method according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

BRIEF DESCRIPTION OF THE DRAWINGS

Now, the invention is explained in more detail based on preferred embodiments as well as with reference to the attached drawings.
There show.

In the figures, identical and functionally identical elements are provided with the same reference characters.

DESCRIPTION OF THE PREFERRED EMBODIMENTS

Figure 1:
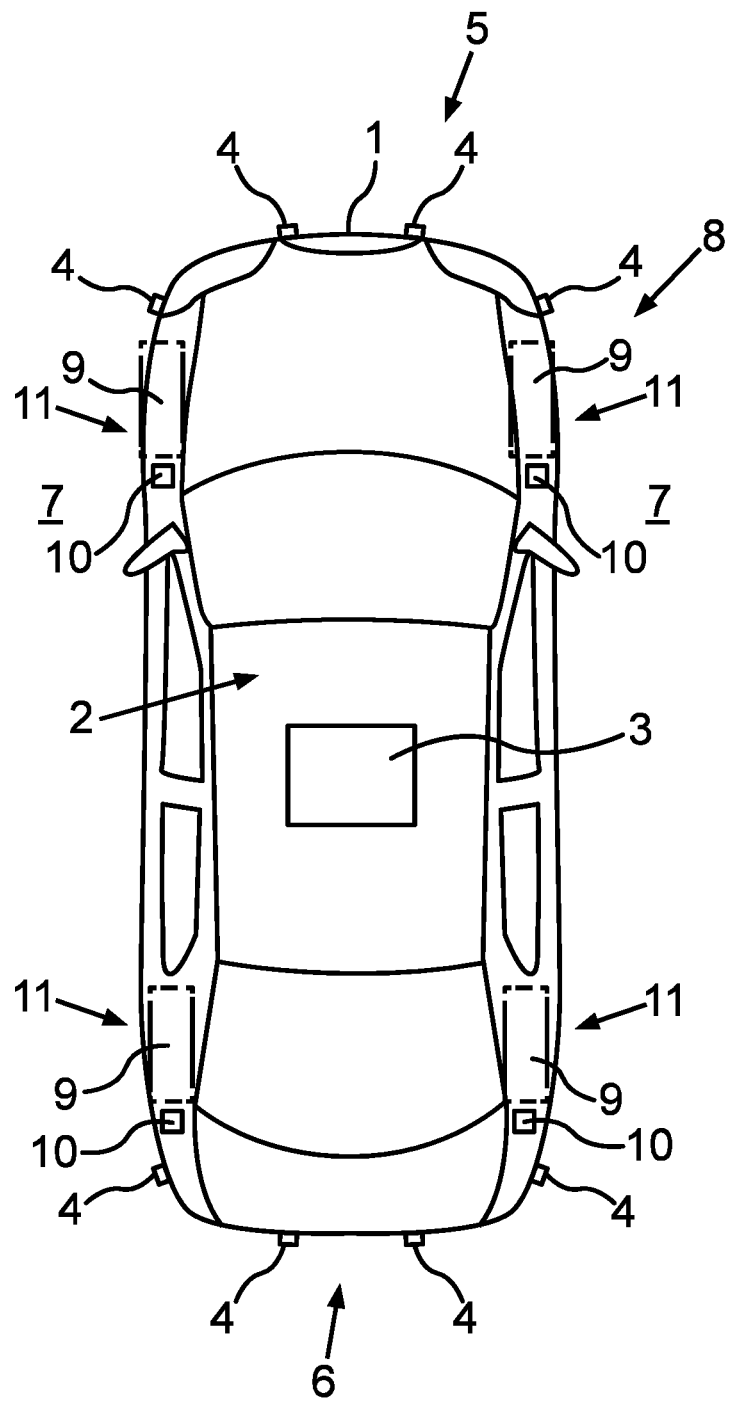
FIG. 1 a motor vehicle according to an embodiment of the present invention, which comprises a sensor assembly.

FIG. 1 shows a motor vehicle 1 according to an embodiment of the present invention in a top view. In the present embodiment, the motor vehicle 1 is formed as a passenger car. The motor vehicle 1 includes a driver assistance system 2. The driver assistance system 2 serves for assisting the driver in driving the motor vehicle 1. The driver assistance system 2 can for example include a parking assistance system, a blind spot assist and/or an adaptive cruise control.

The driver assistance system 2 includes a control device 3, which can for example be constituted by an electronic control unit of the motor vehicle 1. Moreover, the driver assistance system 2 includes a plurality of ultrasonic sensors 4. In the present embodiment, the driver assistance system 2 includes eight ultrasonic sensors 4. Therein, four ultrasonic sensors 4 are disposed in a front area 5 of the motor vehicle 1 and four ultrasonic sensors 4 are disposed in a rear area 6 of the motor vehicle 1. The ultrasonic sensors 4 can for example be disposed in the bumpers or hidden behind the bumpers. An object in an environmental region 7 of the entire motor vehicle 1 can be captured by the ultrasonic sensors 4. Hereto, the ultrasonic sensors 4 each emit an ultrasonic signal and receive the ultrasonic signal reflected from the object.

The ultrasonic sensors 4 are connected to the control device 3 for data transfer. Corresponding data lines are presently not illustrated for the sake of clarity. Based on the measurement signals received by the ultrasonic sensors 4, the position of one or more objects in the environmental region 7 of the motor vehicle 1 can be captured. Depending thereon, a corresponding control signal can be provided by the control device 3, by which the motor vehicle 1 can be at least semi-autonomously maneuvered. Hereto, an intervention in the steering of the motor vehicle, in a brake system and/or in a drive engine can be performed. Thus, the driver of the motor vehicle 1 can for example be assisted in a parking operation.

Further, the driver assistance system 2 includes a sensor assembly 8. The sensor assembly 8 includes at least one sensor device 10. In the present embodiment, the sensor assembly 8 includes four sensor devices 10. therein, each one sensor device 10 is associated with a wheel 9 of the motor vehicle 1. The sensor devices 10 are in particular associated with the respective wheel cases 11 or wheel houses of the motor vehicle 1. Acoustic signals and/or mechanical oscillations in the wheel case 11 can be captured by the sensor devices 10. In addition, the sensor devices 10 are connected to the control device 3 for data transfer.

Figure 2:
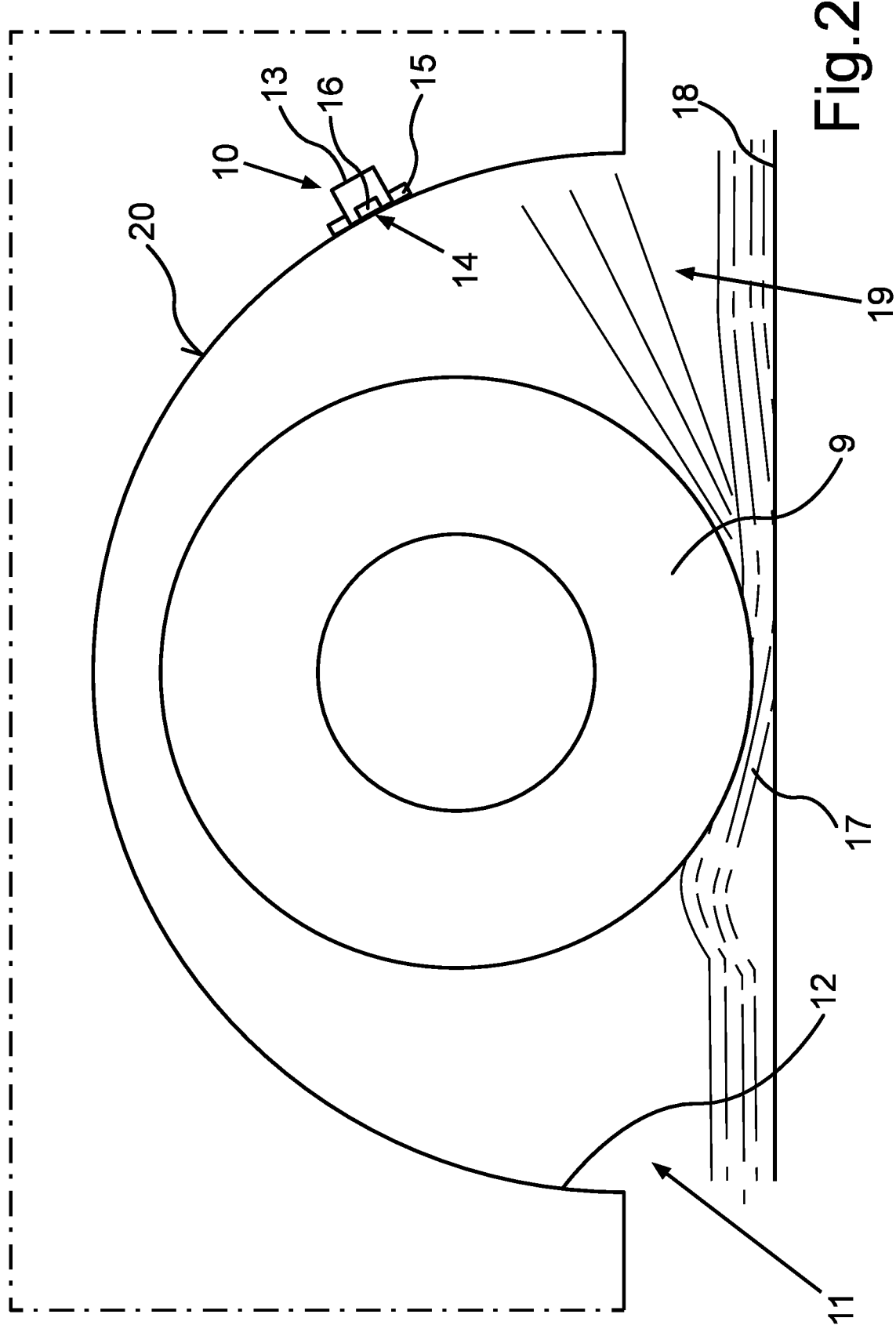
FIG. 2 a sensor device of the sensor assembly, which is disposed behind a wheel arch lining of the motor vehicle.

FIG. 2 shows a partial representation of the motor vehicle 1, wherein a wheel case 11 of the motor vehicle 1 is seen. The wheel 9 of the motor vehicle 1 is disposed within the wheel case 11. The wheel case 11 comprises a wheel arch lining 12, which is for example manufactured from a plastic. Presently, it is apparent that the sensor device 10 is disposed on a side 20 of the wheel arch lining 12 facing away from the wheel 9. Thus, the sensor device 10 is disposed hidden behind the wheel arch lining 12.

The sensor device 10 includes an ultrasonic sensor 13. The ultrasonic sensor 13 can be formed identical in construction to the ultrasonic sensors 4. The ultrasonic sensor 13 in turn includes a membrane 14. This membrane 14 can for example be pot-shaped formed. The membrane 14 can have a resonant frequency of about 50 kHz, in particular 51.2 kHz. The membrane 14 can be manufactured from a metal, in particular aluminum. A transducer element 16 is disposed within the membrane 14, which can for example be constituted by a piezoelectric element. The transducer element 16 is mechanically coupled to the membrane 14. Thus, oscillations of the membrane 14 can be captured with the aid of the transducer element 16 and be output as a sensor signal, in particular in the form of an electrical voltage. Further, the sensor device 10 includes a retaining element 15, by which the ultrasonic sensor 13 is retained on the rear side 20 of the wheel arch lining 12. The membrane 14 of the ultrasonic sensor 13 is mechanically coupled to the wheel arch lining 12.

The motor vehicle 1 is moved on a roadway 18 or on a roadway surface. Herein, the wheel 9 of the motor vehicle 1 is rolled on the roadway 18. Presently, water 17 is on the surface of the roadway 18. Presently, the case of the so-called aquaplaning is illustrated, in which the wheel 9 floats on the water 17. In this case, a water wedge slides below the tire contact area of the wheel 9 and thereby results in loss of adhesion. If water 17 is on the surface of the roadway 18, it is projected by the rotation of the wheel 9 and impacts on the wheel arch lining 12. Presently, this is schematically illustrated in an area 19. As a result of the impact of the water 17 on the wheel arch lining 12, an acoustic signal arises within the wheel case 11. In addition, the wheel arch lining 12 is excited to mechanical oscillations. The acoustic signal and/or the mechanical oscillation of the wheel arch lining 12 can be captured with the aid of the sensor device 10 or the ultrasonic sensor 13. Hereto, the mechanical oscillation of the membrane 14 is captured with the aid of the transducer element 16. The sensor signal can then be transmitted to the control device 3 by the transducer element 16. Based on the frequency and/or amplitude of the sensor signal, the control device 3 can then determine the amount of the water 17, which is on the roadway 18. If the amount of the water 17 on the roadway 18 exceeds a predetermined limit value, a control signal can be output by the control device 3, as a result of which the speed of the motor vehicle 1 is reduced. Thus, aquaplaning can for example be prevented.

Figure 3:
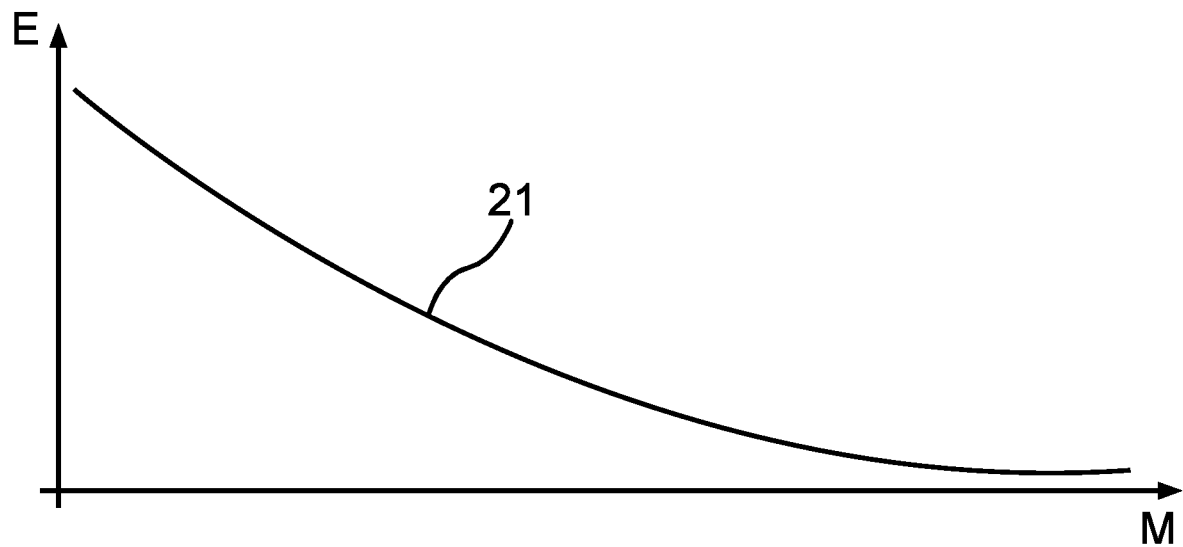
FIG. 3 a diagram, which describes the progression of the sensitivity of the sensor device depending on an amount of the water impacting on the wheel arch lining.

FIG. 3 shows a graph, which describes the sensitivity of the ultrasonic sensor 13 depending on the amount M of the water 17, which impacts on the wheel arch lining 12. Therein, the curve 21 describes the progression of the sensitivity E depending on the amount M of the water. Herein, it is apparent that the sensitivity E is reduced with increasing amount M. The sensitivity E of the ultrasonic sensor 13 can for example be adjusted in that a corresponding threshold value is preset. Therein, only signal portions of the sensor signal are taken into account, which are above the threshold value. For example, a low threshold value can first be preset. This allows capturing individual drops of the water 17, which impact on the wheel arch lining 12. Thus, a low amount M of water 17, which is on the roadway 18, can already be captured. If the amplitude of the sensor signal increases, the threshold value can be increased. Thus, the sensitivity E of the ultrasonic sensor 13 is therefore reduced. Thus, water 17, which impacts on the wheel arch lining 12 in the form of splash water, can be captured.

By the adaptation of the sensitivity E of the ultrasonic sensor 13, the presence of water 17 on the surface of the roadway 18 can be recognized depending on situation. In particular, an amplifier of the ultrasonic sensor 13 can be prevented from going into saturation. This is illustrated based on FIG. 4. Therein, the upper graph shows a non-regulated sensor signal Su depending on the amount M of the water 17, which impacts on the wheel arch lining 12. If the amount M increases, it can no longer be differentiated between a change of a state, in which water 17 impacts on the wheel arch lining 12, and a state, in which water 17 does not impact on the wheel arch lining 12. In an area 22, the amplifier of the ultrasonic sensor 13 goes into saturation.

Figure 4:
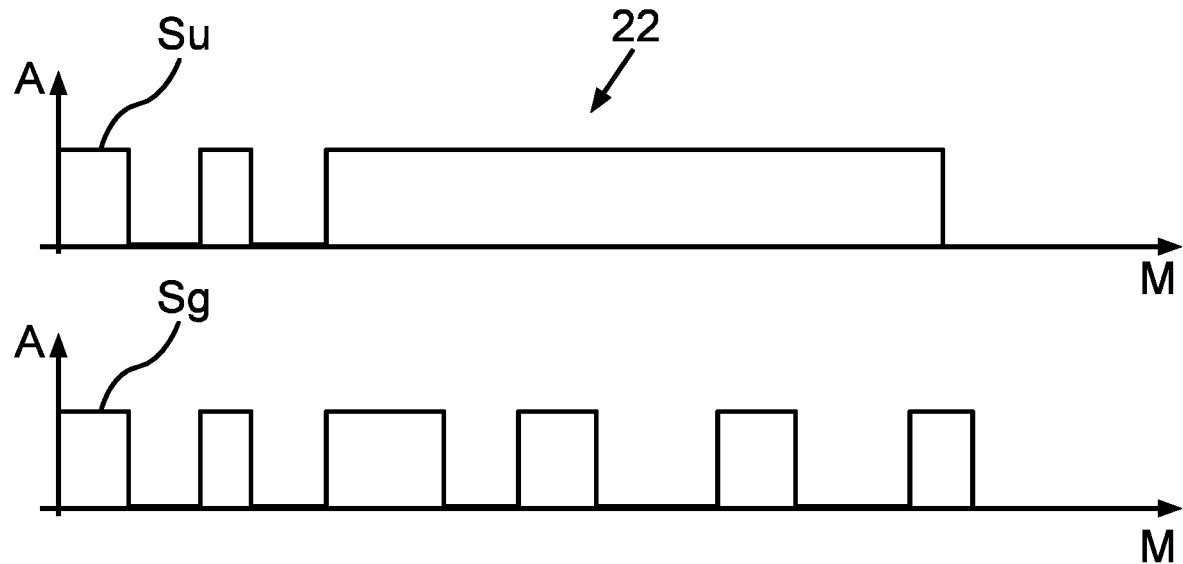
FIG. 4 sensor signals of the sensor device, in which the sensitivity is not adapted, compared to sensor signals of the sensor device, in which the sensitivity is adapted depending on the amount of the water.

Compared hereto, the lower graph in FIG. 4 shows a regulated sensor signal Sg, in which the sensitivity E of the ultrasonic sensor 13 is adapted depending on the amount M of the water 17, which impacts on the wheel arch lining 12. In particular, the sensitivity E of the ultrasonic sensor 13 is adapted according to the graph of FIG. 3. Here, it is apparent that even with increasing amount M of the water 17, a change between the states can be recognized. Thus, the state of a roadway 18 can be recognized with the aid of a commercial ultrasonic sensor 13 by the sensor assembly 8. In particular, it can be recognized if and which amount M of water 17 is on the roadway 18.

The invention claimed is:

1. A sensor assembly for recognizing a state of a roadway comprising:
   a sensor device, which is adapted to capture an impact of water on a wheel arch lining of a motor vehicle during travel of the motor vehicle on the roadway, and
   a control device for recognizing the state of the roadway based on the impact of the water captured by operation of the sensor device,
   characterized in that
   the sensor device includes an ultrasonic sensor, which is adapted to receive an ultrasonic signal and which is additionally adapted to capture the impact of the water on the wheel arch lining, and
   the control device is adapted to operate the ultrasonic sensor in a receiving mode for capturing the water impacting on the wheel arch lining, in which a transducer element determines an oscillation of a membrane of the ultrasonic sensor.

2. The sensor assembly according to claim 1, characterized in that
   the ultrasonic sensor is disposed such that the water impacting on the wheel arch lining causes a mechanical oscillation of a membrane of the ultrasonic sensor.

3. The sensor assembly according to claim 2, characterized in that
   the membrane of the ultrasonic sensor is at least partially formed of a metal.

4. The sensor assembly according to claim 1, characterized in that
   the ultrasonic sensor is disposed on a side of the wheel arch lining facing away from a wheel of the motor vehicle.

5. The sensor assembly according to claim 1, characterized in that
   the wheel arch lining comprises a passage opening and the ultrasonic sensor is disposed within the passage opening at least in certain areas.

6. The sensor assembly according to claim 1, characterized in that
   the transducer element is adapted to provide a sensor signal, which describes the oscillation of the membrane, and
   the control device is adapted to examine the sensor signal in a frequency range between 2 and 5 kHz and/or in a frequency range of a resonant frequency of the membrane for determining the state of the roadway.

7. The sensor assembly according to claim 1, characterized in that
   the control device is adapted to determine an amount (M) of the water impacting on the wheel arch lining and to adapt a sensitivity (E) of the ultrasonic sensor depending on the determined amount (M).

8. The sensor assembly according to claim 7, characterized in that
   the control device is adapted to reduce the sensitivity (E) of the ultrasonic sensor with increasing amount (M) of the water.

9. A driver assistance system for a motor vehicle having a sensor assembly, the sensor assembly comprising:
   a sensor device, which is adapted to capture an impact of water on a wheel arch lining of the motor vehicle during travel of the motor vehicle on the roadway, and
   a control device for recognizing the state of the roadway based on the impact of the water captured by operation of the sensor device,
   characterized in that
   the sensor device includes an ultrasonic sensor, which is adapted to receive an ultrasonic signal and which is additionally adapted to capture the impact of the water on the wheel arch lining, and
   the control device is adapted to operate the ultrasonic sensor in a receiving mode for capturing the water impacting on the wheel arch lining, in which a transducer element determines an oscillation of a membrane of the ultrasonic sensor.

10. The driver assistance system according to claim 9, characterized in that
    the driver assistance system comprises at least one further ultrasonic sensor, which is adapted to capture an object in an environmental region of the motor vehicle.

11. The driver assistance system according to claim 10, characterized in that
    the control device of the sensor assembly is connected to the at least one further ultrasonic sensor for data transfer.

12. The driver assistance system according to claim 9, characterized in that
    the driver assistance system is adapted to control an information interface to a driver of the motor vehicle and/or to adapt a speed of the motor vehicle depending on the state of the roadway captured by the sensor assembly.

13. A motor vehicle with a driver assistance system having a sensor assembly, the sensor assembly comprising:
- a sensor device, which is adapted to capture an impact of water on a wheel arch lining of the motor vehicle during travel of the motor vehicle on the roadway, and
- a control device for recognizing the state of the roadway based on the impact of the water captured by operation of the sensor device,
- characterized in that
- the sensor device includes an ultrasonic sensor, which is adapted to receive an ultrasonic signal and which is additionally adapted to capture the impact of the water on the wheel arch lining, and
- the control device is adapted to operate the ultrasonic sensor in a receiving mode for capturing the water impacting on the wheel arch lining, in which a transducer element determines an oscillation of a membrane of the ultrasonic sensor.

14. A method for recognizing a state of a roadway comprising:
- by a sensor device, capturing an impact of water on a wheel arch lining of a motor vehicle during travel of the motor vehicle on the roadway,
- by a control device, recognizing the state of the roadway based on the impact of the water captured by operation of the sensor device; and
- by an ultrasonic sensor of the sensor device, emitting an ultrasonic signal and receiving the ultrasonic signal reflected from an object,
- wherein the impact of the water on the wheel arch lining is captured by the ultrasonic sensor, and
- wherein the control device is adapted to operate the ultrasonic sensor in a receiving mode for capturing the water impacting on the wheel arch lining, in which a transducer element determines an oscillation of a membrane of the ultrasonic sensor.

* * * * *